(12) United States Patent
Vadlamudi

(10) Patent No.: US 10,896,290 B2
(45) Date of Patent: Jan. 19, 2021

(54) AUTOMATED PATTERN TEMPLATE GENERATION SYSTEM USING BULK TEXT MESSAGES

(71) Applicant: Infocredit Services Private Limited, Mumbai (IN)

(72) Inventor: Satya Gautam Vadlamudi, Telangana (IN)

(73) Assignee: INFOCREDIT SERVICES PRIVATE LIMITED, Mumbai (IN)

( * ) Notice: Subject to any disclaimer, the term of this patent is extended or adjusted under 35 U.S.C. 154(b) by 79 days.

(21) Appl. No.: 16/201,716

(22) Filed: Nov. 27, 2018

(65) Prior Publication Data

US 2020/0081969 A1    Mar. 12, 2020

(30) Foreign Application Priority Data

Sep. 6, 2018  (IN) .............................. 201821033593

(51) Int. Cl.
*G06F 17/20* (2006.01)
*G06F 40/186* (2020.01)
*G06Q 10/10* (2012.01)

(52) U.S. Cl.
CPC ......... *G06F 40/186* (2020.01); *G06Q 10/107* (2013.01)

(58) Field of Classification Search
CPC ............................ G06F 40/186; G06Q 10/107
See application file for complete search history.

(56) References Cited

U.S. PATENT DOCUMENTS

| | | | | |
|---|---|---|---|---|
| 6,477,571 B1* | 11/2002 | Ross | ................... | H04L 41/5054 709/224 |
| 7,739,337 B1* | 6/2010 | Jensen | ..................... | H04L 51/12 709/206 |
| 8,626,843 B2* | 1/2014 | Wittig | .................. | G06Q 10/107 709/206 |
| 9,940,318 B2* | 4/2018 | Miklos | ................... | G06F 40/242 |
| 10,216,837 B1* | 2/2019 | Saikia | .................. | G06K 9/6201 |
| 2005/0065967 A1* | 3/2005 | Schuetze | ................. | G06F 16/88 |
| 2008/0005265 A1* | 1/2008 | Miettinen | ............. | G06F 40/186 709/217 |
| 2008/0072140 A1* | 3/2008 | Vydiswaran | .......... | G06F 16/986 715/243 |
| 2009/0125529 A1* | 5/2009 | Vydiswaran | .......... | G06F 16/951 |
| 2009/0216708 A1* | 8/2009 | Madaan | ................ | G06F 16/355 |

(Continued)

*Primary Examiner* — Shahid K Khan
(74) *Attorney, Agent, or Firm* — BakerHostetler

(57) ABSTRACT

An automated pattern template generation system is provided. The system includes a memory having computer-readable instructions stored therein and a processor. The processor is configured to access a plurality of messages and process each of the plurality of messages to identify presence of string identifiers and numeric identifiers present in each of the plurality of messages. The processor is further configured to replace an identified numeric identifier in each message by a numeric label to generate a candidate template corresponding to the message. Furthermore, the processor is configured to merge the generated candidate templates based on pre-determined merging rules to replace one or more identified string identifiers with pre-determined string labels to generate the pattern templates. Each of the generated pattern templates includes numeric labels, string labels, or combinations thereof.

18 Claims, 7 Drawing Sheets

(56) References Cited

U.S. PATENT DOCUMENTS

| | | | |
|---|---|---|---|
| 2009/0276506 A1* | 11/2009 | Tiwari | G06F 40/186 709/220 |
| 2010/0169311 A1* | 7/2010 | Tengli | G06F 16/951 707/736 |
| 2010/0313119 A1* | 12/2010 | Baldwin | G06T 11/001 715/256 |
| 2011/0276874 A1* | 11/2011 | Dejean | G06F 40/186 715/243 |
| 2012/0215853 A1* | 8/2012 | Sundaram | H04L 63/126 709/206 |
| 2013/0268839 A1* | 10/2013 | Lefebvre | G06Q 10/107 715/234 |
| 2014/0006522 A1* | 1/2014 | Syrowitz | G06Q 10/107 709/206 |
| 2015/0339285 A1* | 11/2015 | Safaei | H04L 51/18 715/256 |
| 2015/0370885 A1* | 12/2015 | Kushmerick | G06F 16/353 707/737 |
| 2016/0110763 A1* | 4/2016 | Mastierov | G06Q 30/0269 705/14.53 |
| 2016/0135021 A1* | 5/2016 | He | H04L 51/36 455/466 |
| 2016/0335243 A1* | 11/2016 | Zhai | G06F 16/951 |
| 2018/0060314 A1* | 3/2018 | Xu | G06F 16/258 |
| 2019/0034403 A1* | 1/2019 | Pal | H04L 51/32 |
| 2019/0108487 A1* | 4/2019 | Foss | G06F 16/335 |
| 2020/0012709 A1* | 1/2020 | Kogler | G06F 40/177 |
| 2020/0134006 A1* | 4/2020 | de Beus | G06F 16/338 |

\* cited by examiner

AUTOMATED PATTERN TEMPLATE GENERATION SYSTEM USING BULK TEXT MESSAGES

PRIORITY STATEMENT

The present application claims priority under 35 U.S.C. § 119 to Indian patent application number 201821033593 filed 6 Sep. 2018, the entire contents of which are hereby incorporated herein by reference.

FIELD

At least one example embodiment generally relates to systems and methods to extract and analyze information from bulk text messages and more particularly to a system and method for automated pattern template extraction using bulk messages.

BACKGROUND

In recent years, texts such as short message service (SMS) texts have become an important data resource. With extensive use of electronic devices such as tablets and smartphones in the present times, most information exchange is being done electronically. Electronic written bulk messages such as short messages (SMS) are used across domains such as business, education, research, and the like to transmit relevant information.

Information extracted from the messages may be used for various value-add use-cases, such as, to determine personalized recommendations, predictive modelling, and so on. For example, information associated with financial transactions such as credit and debit transactions are transmitted to the users via SMS. Such messages can be a great source of information to understand customers spending behaviors.

Standard algorithms for template-based information extraction require pre-defined template schemas to perform data extraction. Some of the existing techniques focus on template extraction and merging at a very high level. While others just provide a solution to semantic understanding of the texts. However, such current approaches to information extraction have a very specific and narrow focus. For example, extracting dates, time, locations and titles. Some techniques focus on learning ontologies from natural language texts for identifying actions, objects and properties.

Extracting information from bulk messages can be challenging as most of the data extraction is performed manually using regular expressions (regex). This may require extensive human effort to identify which messages should be focused upon and which values and/or information are to be extracted out. It may be a difficult task to identify the messages that if focused upon would result in most amount of feature extraction. It may also be difficult to identify the generality of the regexs. Another issue is that the writing the regexs once the messages and the information to be extracted are identified can be effort and time consuming. Writing regexs manually may be limited by amount of human resources working on the task and it in-turn defines the coverage of the messages from which features are extracted.

In some cases, multiple regexs can be written for extracting same set of features which in-turn demands the human to be skilled at identifying which regex is more efficient in terms of performance. Moreover, multiple regexs written by humans can match a given short text. In such cases it may be non-trivial to decide which (one or more) regexs should be applied on the text and what features should be extracted. There may be use of a precedence order while processing the messages using regexs, but this approach not only increases the effort while building such a system but also adversely affects the system performance while processing.

Thus, there is a need to develop a system and method for effective, fast and direct information/features extraction from bulk messages that can be further used to generate pattern templates for bulk messages.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide system and method for generation of pattern templates using bulk text messages.

Briefly, according to an example embodiment, an automated pattern template generation system is provided. The system includes a memory having computer-readable instructions stored therein and a processor. The processor is configured to access a plurality of messages and process each of the plurality of messages to identify presence of string identifiers and numeric identifiers present in each of the plurality of messages. The processor is further configured to replace an identified numeric identifier in each message by a numeric label to generate a candidate template corresponding to the message. Furthermore, the processor is configured to merge the generated candidate templates based on pre-determined merging rules to replace one or more identified string identifiers with pre-determined string labels to generate the pattern templates. Each of the generated pattern templates includes numeric labels, string labels, or combinations thereof.

According to another example embodiment, an automated pattern template generation system is provided. The system includes a memory having computer-readable instructions stored therein and a templates repository having a plurality of pattern templates stored therein. The system further includes a processor configured to receive a message transmitted to a user by an external agency. The processor is configured to process the message to identify presence of a string identifier and/or a numeric identifier in the transactional message. In addition, the processor is configured to replace the identified numeric identifier in the message by a numeric label to generate a candidate template. Further the processor is configured to compare the generated candidate template with the existing pattern templates to determine if the generated candidate template can be merged with an existing pattern template. The templates to be merged are identified based upon number of string identifiers in the templates, number of numeric identifiers in the templates, matching positions of the string identifiers and/or the numeric identifiers, number of distinct string identifiers in the templates, or combinations thereof. Furthermore, the processor is configured to merge the candidate template with at least one of the plurality of pattern templates or create a new pattern template equivalent to the respective candidate template. Any distinct string identifiers are replaced with corresponding string labels.

In a further embodiment, a method for generating pattern templates is provided. The method includes accessing a plurality of messages. The method further includes processing each of the plurality of messages to identify presence of a string identifier and a numeric identifier present in each of the plurality of messages. In addition, the method includes replacing an identified numeric identifier in each message by a numeric label to generate a candidate template corresponding to the message. Further, the method includes merging the generated candidate templates based on pre-determined merging rules to generate the pattern templates. One or more identified string identifier are replaced with pre-determined string labels. Furthermore, the method includes storing the generated candidate templates and the pattern templates.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
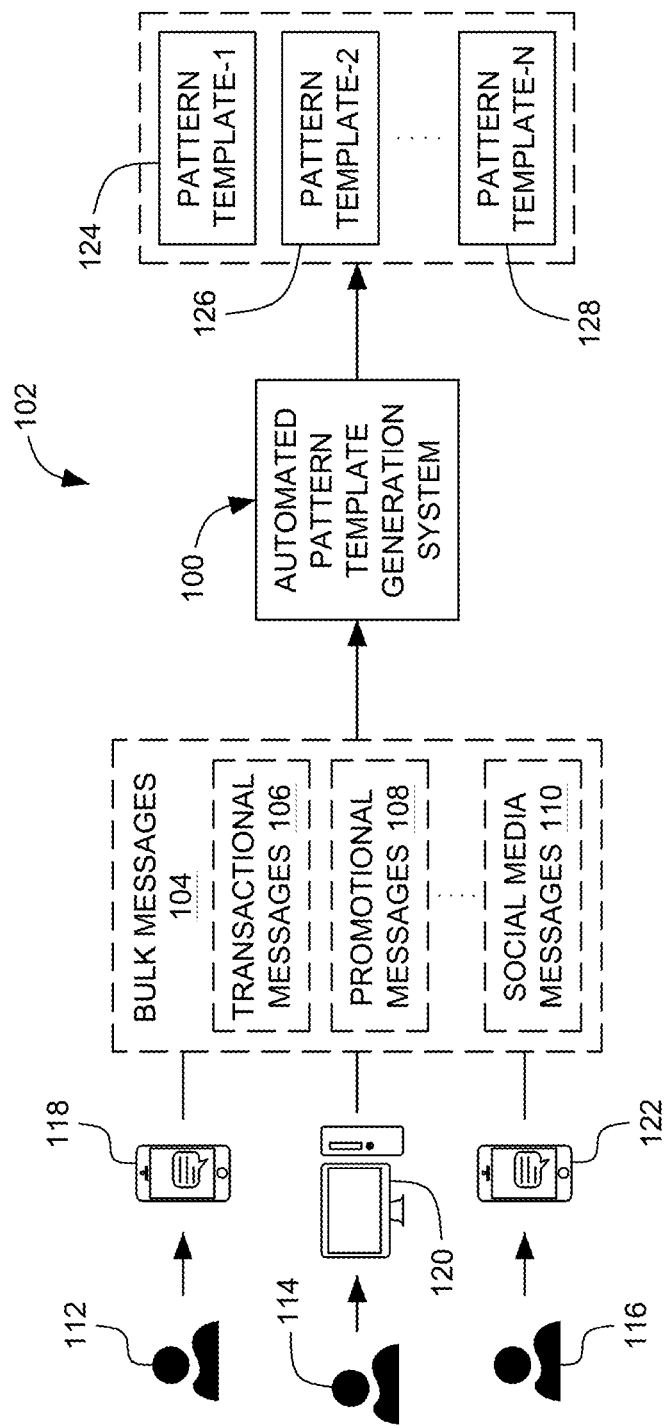
FIG. 1 illustrates an example automated pattern template generation system used for generating templates in an environment implemented according to the aspects of the present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher-level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

At least one example embodiment is generally directed to a system for generating pattern templates using bulk messages received by users from a variety of institutions such as promotional messages from retail stores, financial transactional messages from banks, among others. It should be noted that the bulk messages may include a wide variety of messages such as short message service (SMS) text, email, or combinations thereof.

FIG. 1 illustrates an example automated pattern template generation system 100 used for generating templates in an environment 102 implemented according to the aspects of the present technique. As illustrated, the automated pattern template generation system 100 is configured to access a plurality of messages (bulk messages) 104 received by one or more users (such as represented by reference numerals 112, 114 and 116) from an entity. The users (112, 114, 116) may receive the plurality of messages 104 from various entities such as a financial entity, a retail entity, a social media site, a telecommunication service, and the like. In an embodiment, the plurality of messages 104 may include transactional messages 106, promotional messages 108, social media messages 110, or combinations thereof. For example, the transactional messages 106 may provide information about financial transactions carried out by a user 112 linked to a bank account. Similarly, the social media messages 110 may provide information regarding interactions between users and the corresponding social media site. A variety of such messages 104 may be received by the users 112, 114 and 116.

In operation, the messages 104 received by the plurality of users (e.g. 112, 114 and 116) are accessed by the automated pattern template generation system 100. In an embodiment, the messages 104 are processed by the automated pattern template generation system 100 to generate a plurality of pattern templates such as represented by reference numerals 124 through 128. In one embodiment, the plurality of messages 104 may include natural language short text messages received via one or more electronic devices (e.g., 118, 120 and 122) of the one or more users (e.g. 112, 114 and 116). The electronic devices 118, 120 and 122 may be a mobile phone, a laptop, a hand-held device, among others.

It may be noted that one or more pattern templates (e.g., 124, 126 and 128) may correspond to each of the one or more types of messages such as transactional messages 106, promotional messages 108, social media messages 110, and the like. For example, the pattern template 124 may be generated corresponding to all the transactional messages 106 received by the one or more users (such as 112, 114 and 116). Similarly, the pattern template 126 may be generated corresponding to all the promotional messages 108 received by the one or more users (such as 112, 114 and 116), and so forth. It should be noted that one or more pattern templates (124, 126 and 128) are generated corresponding to each of the one or more types of messages (106, 108 and 110). As used herein, the term "pattern template" corresponds to a generic template with one or more labels designed/generated using the plurality of bulk messages. The manner in which the pattern templates are generated using the system 100 will be described in detail with reference to FIG. 2.

Figure 2:
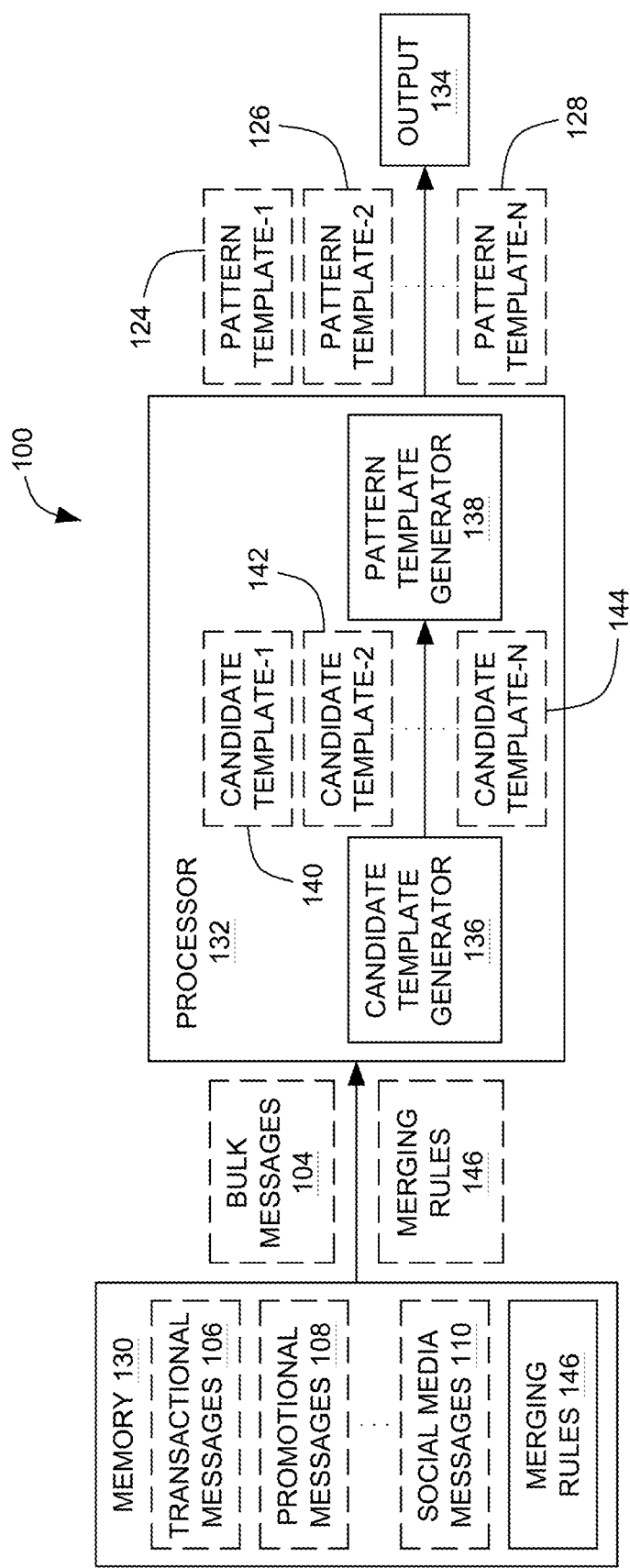
FIG. 2 is a block diagram illustrating the automated pattern template generation system of FIG. 1, implemented according to the aspects of the present technique.

FIG. 2 is a block diagram illustrating the automated pattern template generation system 100 of FIG. 1, implemented according to the aspects of the present technique. The system 100 includes a memory 130, a processor 132 and an output 134. Each component is described in further detail below.

As illustrated, the processor 132 is communicatively coupled to the memory 130 and is configured to access the plurality of messages 104 and merging rules 146 stored in the memory 130. The processor 132 further includes a candidate template generator 136 and a pattern template generator 138. The candidate template generator 136 is configured to process each of the plurality of messages 104 to identify presence of numeric identifiers present in each of the plurality of messages 104. In this embodiment, the candidate template generator 136 is configured to process a short message service (SMS) text, an email, or combinations thereof. It may be noted that the message 104 may include the transactional message 106, the promotional message 108, the informational message 110, or combinations thereof. For example, the transactional messages 106 may be received by a user 112 from a financial entity that manages an account of the user 112. Such transactional messages 106 are received in response to an occurrence of an event associated with the account. In this example embodiment, the transactional messages 106 are associated with credit transactions, debit transactions, or combinations thereof associated with the account of the user 112.

The candidate template generator 136 is further configured to replace an identified numeric identifier in each message (e.g., 106) by a numeric label to generate a candidate template corresponding to the message 106. In an embodiment, one or more candidate templates such as represented by reference numerals 140, 142 and 144 are generated.

The pattern template generator 138 is configured to merge the generated candidate templates (e.g., 140, 142 and 144) based on pre-determined merging rules 146 that may be accessed from the memory 130. In one embodiment, one or more candidate templates (e.g., 140, 142 and 144) are identified to be merged based upon a set of merging rules 146 accessed from the memory 130. It may be noted that the number of candidate templates generated may be different than the number of pattern templates. In an embodiment, the set of merging rules 146 may include comparing number of string identifiers in the templates, number of numeric identifiers in the templates, matching positions of the string identifiers and/or the numeric identifiers, number of distinct string identifiers in the templates, or combinations thereof.

In this example embodiment, the one or more candidate templates (e.g., 140, 142 and 144) are identified based upon a user defined range of positions of the string identifiers and/or the numeric identifiers in the respective templates. In an example embodiment, the generated candidate template (e.g., 140) is compared with the existing pattern templates (e.g., 124).

In a further embodiment, the identified candidate templates (e.g., 140, 142 and 144) are merged with the then existing pattern templates to generate more/updated pattern templates (124, 126 and 128). In this embodiment, the message counts associated with the identified candidate templates are added to determine a count for the resulting merged pattern templates. In one embodiment, one or more identified string identifier is replaced with pre-determined string labels to generate one or more pattern templates (124, 126 and 128). In this example, each of the generated pattern templates such as 124, 126 and 128 includes zero or more of the numeric labels and the string labels. In an embodiment, the generated pattern templates are available for display to a user 112 via output 134.

The pattern template generator 138 is further configured to identify one or more candidate templates (e.g., 140, 142 and 144) that cannot be merged with existing templates based upon number of string identifiers in the templates, number of numeric identifiers in the templates, matching positions of the string identifiers and/or the numeric identifiers, number of distinct string identifiers in the templates, or combinations thereof. Such candidate templates (e.g., 140, 142 and 144) may be stored without merging with the existing templates. Further, in an embodiment, a new pattern template may be created and a message count corresponding to that of the candidate template is associated for each new pattern template. In this embodiment, a count of the candidate templates, pattern templates, or combinations thereof, is maintained.

It may be noted that the processor 132 is further configured to analyze user information over a period of time using the generated pattern templates (124, 126 and 128). In addition, such user information may be used to generate customer related insights for each user. Such insights may include personalized user recommendations, location estimation information, user income estimation information, customer credit default behaviors, customer behavioral information, customer preferences, or combinations thereof.

While FIG. 2 illustrates and the following provides a detailed description of various components/modules of the system 100, example embodiments are not limited thereto. For example, the above-identified modules of the system 100 may be implemented via one or more processors (e.g., processor 132) where the one or more processor is configured to execute computer readable instructions stored on a memory (e.g., memory 130) to carry out the functionalities of each of the above-identified modules.

Figure 3:
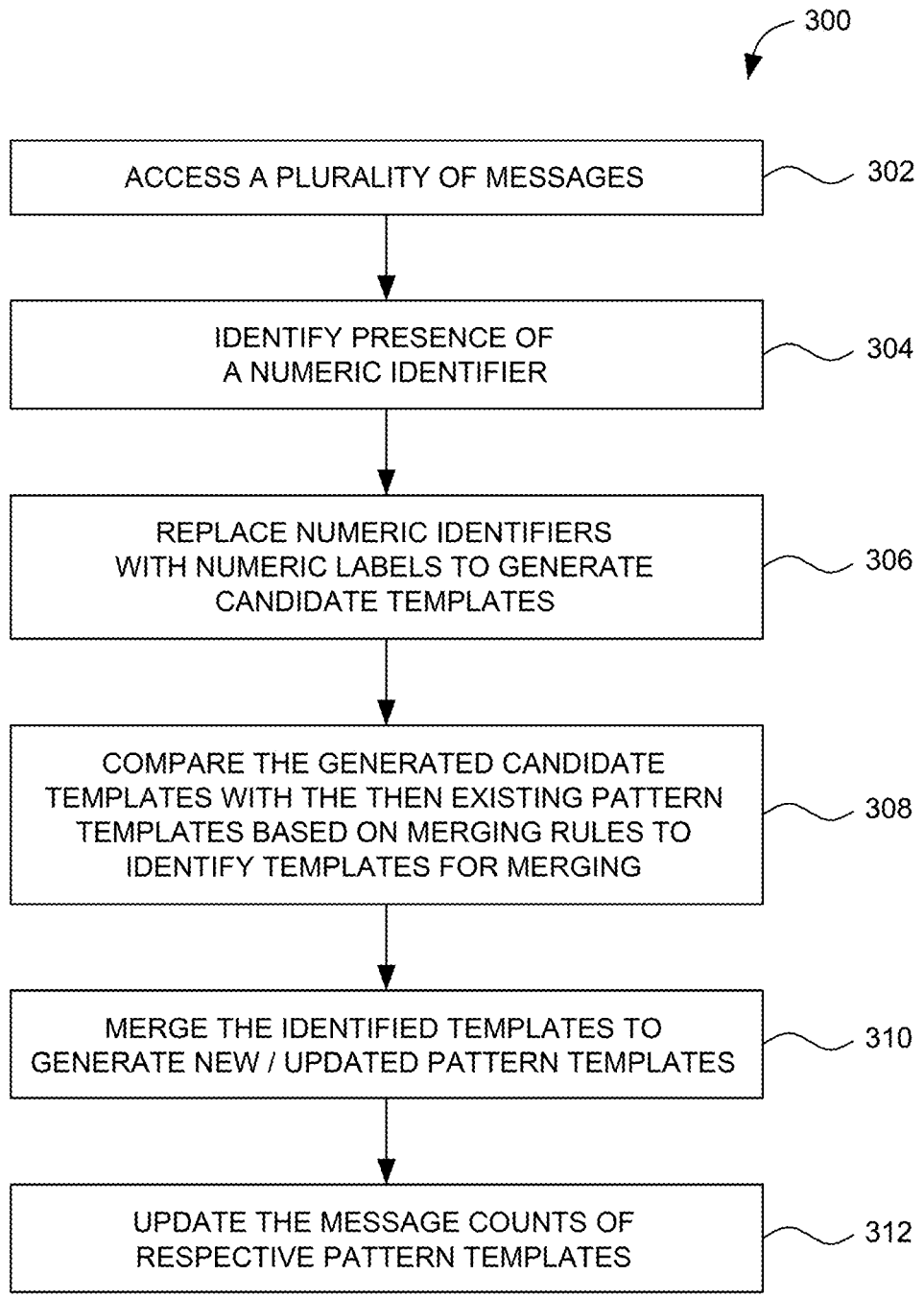
FIG. 3 is a flow diagram illustrating a process for generating pattern templates using the automated pattern template generation system of FIG. 1, according to an example embodiment.

FIG. 3 is a flow diagram illustrating a process 300 for generating pattern templates using the automated pattern template generation system FIG. 1, according to an example embodiment.

At block 302, a plurality of messages 104 received by a plurality of users (e.g. 112, 114 and 116) from entities such as a financial entity, a retail entity, a social media site, a telecommunication service, and the like are accessed by the system 100. In an embodiment, the plurality of messages may include transactional messages 106, promotional messages 108, social media messages 110, or combinations thereof. The plurality of messages 104 may include natural language short text messages received via one or more electronic devices (e.g., 118, 120 and 122) of the one or more users (e.g. 112, 114 and 116).

At block 304, each of the plurality of messages 104 is processed to identify presence of one or more numeric identifiers in the message 104. In an embodiment, the message 104 may be a short message service (SMS) text, an email, or combinations thereof. In addition, the message 104 may be a transactional message (e.g., 106), a promotional message (e.g., 108), an informational message (e.g., 110), or combinations thereof. For example, the transactional messages (e.g., 106) received by the user (112) from a financial entity may include language as below:
"Dear customer, your account has been credited with Rs.20,000" Message 1
"Dear customer, your account has been debited with Rs.10,000" Message 2

In this example, each of the numeric identifier present in each message is identified by the system 100 as the system scans the message from left to right direction. As used herein, the numeric identifier denotes the numeric value present in the statement. In the above messages, the numbers "20,000" and "10,000" correspond to the numeric identifiers.

At block 306, each of the numeric identifier (e.g. 20,000 and 10,000) is replaced in the respective messages by a numeric label to generate a candidate template (e.g., 140) corresponding to each message 104. For example, for Message 1 and Message 2 described above, the numeric identifiers "20,000" and "10,000" are replaced by a numeric label "N0". Thus, the candidate templates generated may be represented as below:
"Dear customer, your account has been credited with Rs. N0"
"Dear customer, your account has been debited with Rs. N0"

In an embodiment, one or more candidate templates (140, 142 and 144) such as described above are generated and stored in a templates repository. Such repository may be a part of the memory 130 or may be a stand-alone repository. In addition, a count of the generated candidate templates (140, 142 and 144) is maintained using a template counter, along with the message count corresponding to each candidate template. However, it may be noted that in cases where the generated candidate template is already present, only the count may be updated. In certain embodiments, separate template counters may be used to track candidate templates, merged templates, partially-merged templates, un-merged templates and generated pattern templates.

At block 308, the generated candidate templates (e.g., 140, 142 and 144) are processed and compared with the then existing pattern templates to identify one or more templates for merging. In this embodiment, each candidate template (e.g., 140) is compared with the existing pattern templates to determine if the generated candidate template (e.g., 140, 142 and 144) can be merged with an existing pattern template. In this example, the candidate templates (140, 142 and 144) are identified based on certain pre-determined merging rules 146 such as number of string identifiers in the templates, number of numeric identifiers, number of distinct string identifiers in the templates, or combinations thereof. For example, the candidate templates (140, 142 and 144) generated may include templates as follows:
"Dear customer, your account has been credited with Rs. N0" Candidate template-1
"Dear customer, your account has been debited with Rs. N0" Candidate template-2

In this example, Candidate template-1 and Candidate template-2 are compared based upon merging rules 146 such number of string identifiers, matching positions of string identifiers, matching positions of numeric identifiers and so on. Based on such merging rules 146, it may be determined if the Candidate template-1 and Candidate template-2 can be merged. In an alternate embodiment, one of the candidate templates may be first determined to be a pattern template (e.g., Pattern template-1), and then the attempt to merge the other candidate templates with the existing set of pattern templates (that includes Pattern template-1) may happen at a later point.

At block 310, the identified candidate templates are merged based on pre-determined merging rules 146. In one embodiment, the identified candidate templates are merged to generate new/updated pattern templates (e.g., 124, 126 and 128). In this example, one or more identified string identifiers are replaced with pre-determined string labels. For example; the identified candidate templates (Candidate template-1 and Candidate template-2) as described above are merged together to generate a new pattern template such as Pattern template-1 described below—
"Dear customer, your account has been S0 with Rs. N0" Pattern template 1

As can be seen the terms "credited" and "debited" are replaced with a string label "S0" to generate the pattern template with both the numeric and string labels.

At block 312, the message count of the respective pattern templates (e.g., 124, 126 and 128) is updated. In one embodiment, a count of an existing pattern template is updated if the candidate template is merged with another pattern template. Alternatively, if the candidate template (140, 142, 144) is not merged with an existing pattern template (e.g., 124), the candidate is added as a new pattern template and the message count of the new pattern template is initiated with the same message count as that of the candidate template. The manner in which the identified candidate templates are merged using the system 100 are described with some examples given in FIG. 4 below.

Figure 4:
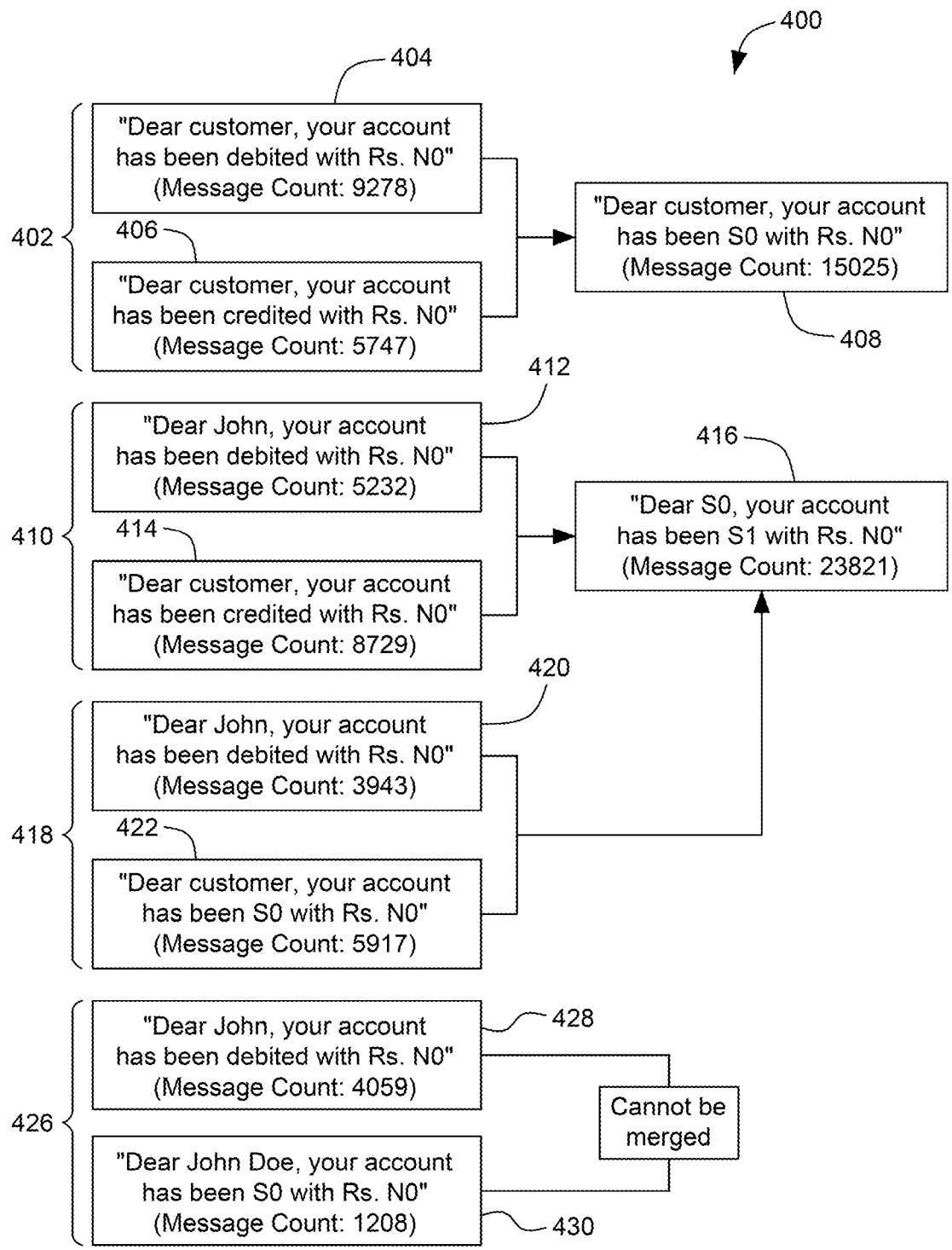
FIG. 4 illustrates examples of pattern templates generated by merging identified candidate templates using the automated pattern template generation system in accordance with the merging rules, implemented according to the aspects of the present technique.

FIG. 4 illustrates examples 400 of pattern templates generated by merging identified candidate templates using the automated pattern template generation system 100 in accordance with the merging rules, implemented according to the aspects of the present technique. In one example, a first set 402 of templates having a candidate template 404 and a candidate template 406 are processed and are identified if the templates 404 and 406 can be merged. Here, string identifiers "debited" and "credited" are determined to be at similar positions in the respective templates 404 and 406. Accordingly, the templates 404 and 406 can be merged to generate a new pattern template 408. In this example, the identified string identifiers ("debited" and "credited") are replaced with a pre-determined string label "S0".

Similarly, in another example, another set 410 of templates having a candidate template 412 and a candidate template 414 are processed and are identified if the templates 412 and 414 can be merged. Here, string identifiers "John" and "customer" are determined to be at similar positions in the respective templates 412 and 414 and are replaced with a pre-determined string label "S0". In addition, string identifiers "debited" and "credited" are determined to be at similar positions in the respective templates 412 and 414 and are replaced with a predetermined string label "S1". Accordingly, the templates 412 and 414 can be merged to generate a new pattern template 416. It may be noted that the number of string identifiers and number of numeric identifiers present in the identified templates should be same.

In another example, a set 418 of templates having a candidate template 420 and an existing pattern template 422 are processed and are identified to determine if the templates 420 and 422 can be merged. Here, string identifiers "John" and "customer" are determined to be at similar positions in the respective templates 420 and 422 and are replaced with a pre-determined string label "S0". In addition, the string identifier "debited" and the string label "S1" are determined to be at similar positions in the respective templates 420 and 422 and are replaced/reassigned with the same string label "S1". Accordingly, the templates 420 and 422 can also be merged into pattern template 416. It may be noted that, once the string identifiers to be merged are identified, the string labels to be associated with respective positions may be reassigned as per the merging rules (146). An example would be to assign them in an increasing order from left to right, such as, S0 for the first identifier from the left, S1 for the second and so forth.

Another example set 426 of templates (428 and 430) are processed. In this example embodiment, it is determined that the templates (428 and 430) cannot be merged based upon number of string identifiers in the templates. In this example, the number of string identifiers in an existing pattern template 430 is more than the candidate template 428.

It may be noted that the merging of a candidate template (e.g., 404) with another candidate template (e.g., 406) or with an existing pattern template (e.g., 422) is based upon a set of merging rules (e.g., 146) accessed from the memory 130. In an embodiment, the set of merging rules 146 may include comparing number of string identifiers in the templates, number of numeric identifiers in the templates, matching positions of the string identifiers and/or the numeric identifiers, number of distinct string identifiers in the templates, or combinations thereof. Examples described above correspond specifically to the financial entity such as a bank. However, it may be noted that pattern templates may be generated for various other entities including a retail entity, a social media site, a telecommunication service, a government entity and the like. Examples of such pattern templates generated across variety of domains are described in FIG. 5 below.

Figure 5:
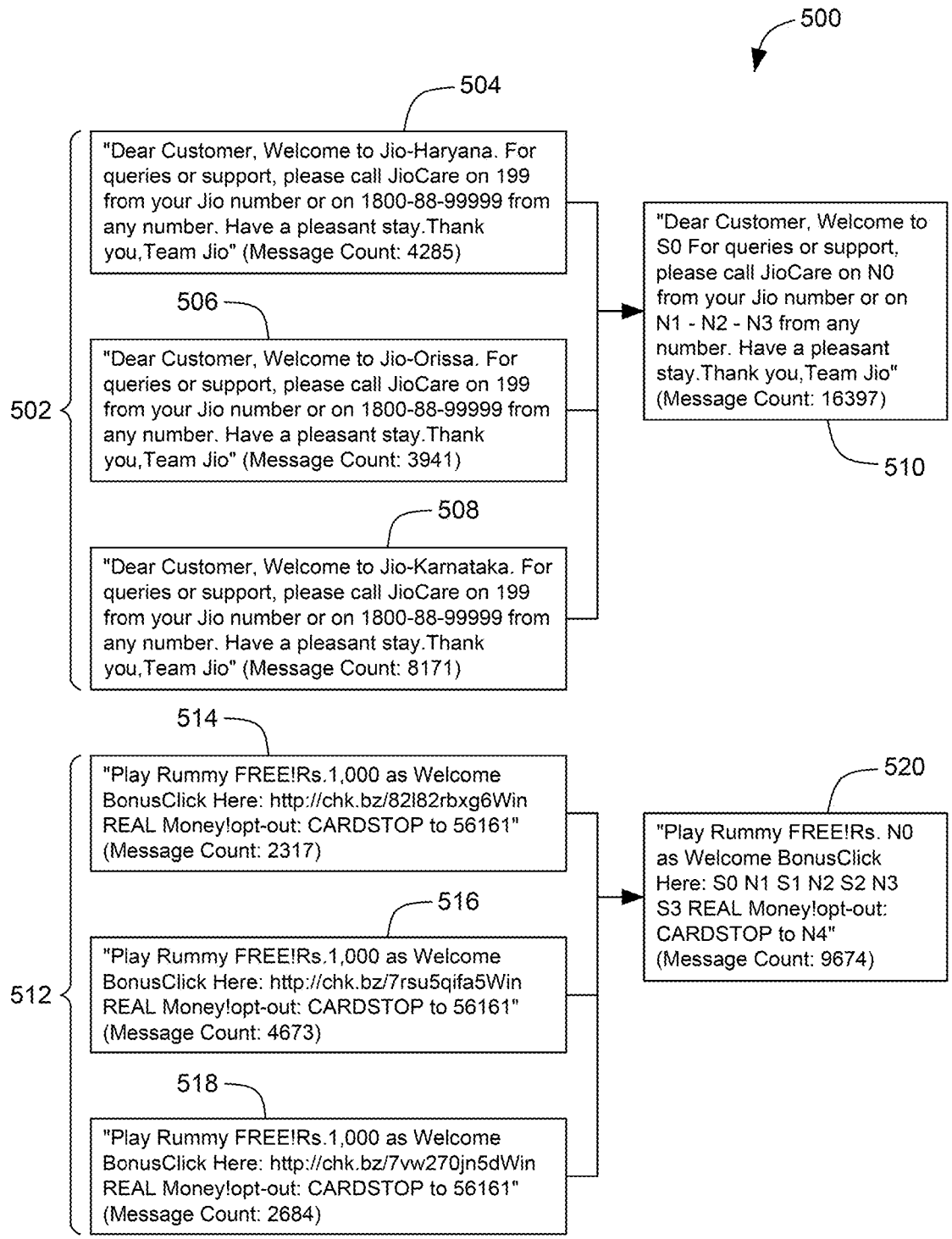
FIG. 5 illustrates examples of pattern templates generated across different domains using the automated pattern template generation system of FIG. 1, implemented according to the aspects of the present technique.

FIG. 5 illustrates examples 500 of pattern templates generated across different domains using the automated pattern template generation system 100 of FIG. 1, implemented according to the aspects of the present technique.

In one example, messages 502 received by a user from a telecommunication service provider are processed to generate pattern templates. In this example, the system 100 is configured to identify presence of numeric identifiers and string identifiers. Here, the numeric identifiers "199" and "1800-88-99999" are identified and replaced by numeric labels to generate the candidate templates. As can be seen, the numeric identifier "199" in messages 504, 506 and 508 is replaced by numeric label "N0". Similarly, the numeric identifier "1800-88-99999" is replaced by numeric labels "N1-N2-N3". In addition, the string identifiers "Jio-Haryana", "Jio-Orissa" and "Jio-Karnataka" are determined to be at similar positions in the messages 504, 506 and 508 respectively. Accordingly, the messages 504, 506 and 508 are processed to generate a new pattern template 510. In this example, the identified string identifiers "Jio-Haryana", "Jio-Orissa" and "Jio-Karnataka" are replaced with a pre-determined string label "S0".

In another example, promotional messages 512 received by a user from an online gaming portal are processed to generate one or more pattern templates. In this example, the messages 514, 516 and 518 are processed by the system 100 to identify presence of numeric identifiers and string identifiers in the messages 514, 516 and 518. The numeric identifiers and the string identifiers are replaced by numeric labels and string labels. For example, the numeric identifier "1000" is replaced by numeric label "N0" and the numeric identifier "56161" is replaced by numeric label "N4". In addition, web addresses "http://chk.bz/82182rbxg6Win", "http://chk.bz/7rsu5qifa5Win" and "http://chk.bz/7vw270jn5dWin" are replaced by a combination of numeric labels and string labels "S0 N1 S1 N2 S2 N3 S3". Accordingly, a new pattern template 520 is generated with numeric labels, string labels, or combinations thereof. It should be noted that message counts of the templates before and after merging may be estimated and tracked and once the templates are merged, the message count may be estimated using a sum of the message counts of the templates that have been merged.

Figure 6:
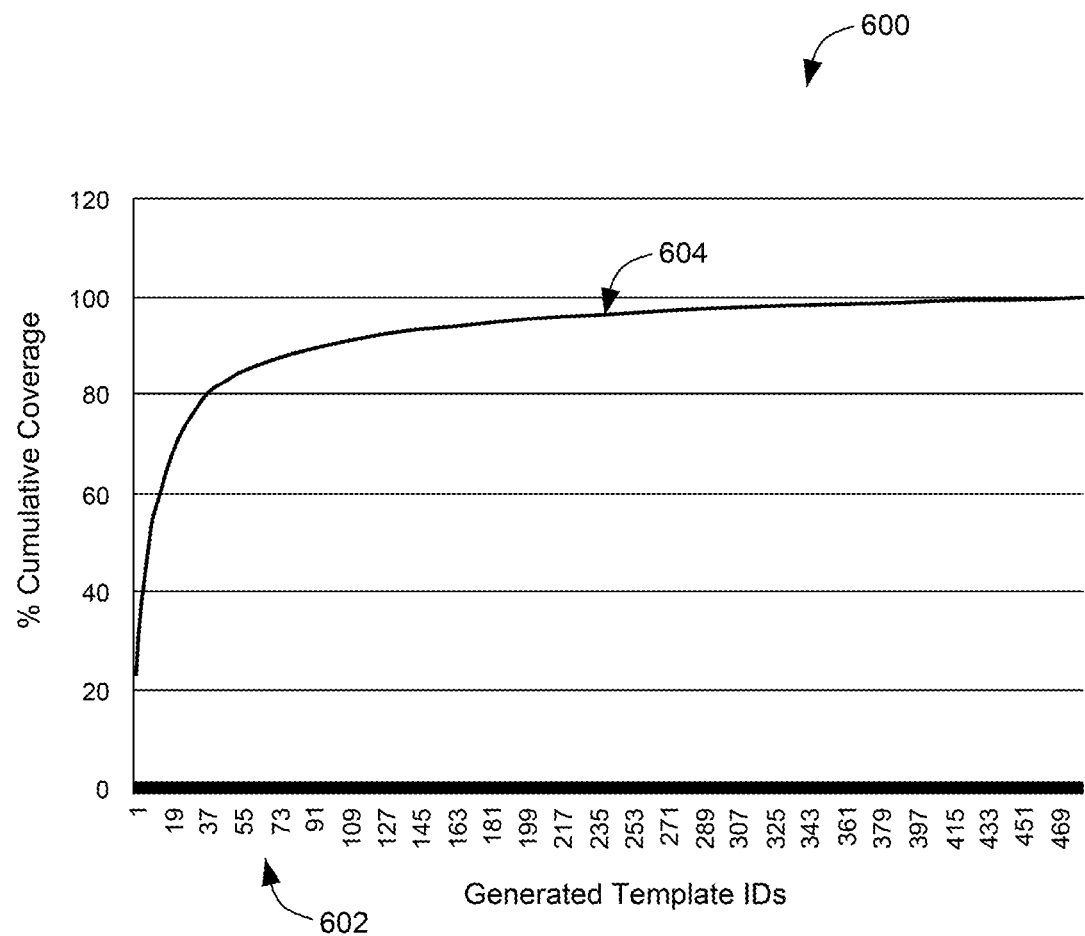
FIG. 6 illustrates a graphical representation of coverage with generated pattern templates obtained using a number of bulk messages, implemented according to the aspects of the present technique.

As described above, the automated pattern template generation system 100 may be used to generate a variety of candidate and pattern templates using the bulk messages. The pattern templates may be used to analyse the user data over a period of time and generate customer related insights, personalized recommendation and other marketing and user related insights. FIG. 6 illustrates a graphical representation 600 of cumulative coverage percentage with generated pattern templates obtained using a number of bulk messages. In this embodiment, template IDs are assigned from 1 to N as per the decreasing order of the message counts associated with that of the templates (template with the highest message count gets template ID 1, second highest gets template ID 2, and so on). The percentage of cumulative coverage of the messages with respect to template identifications numbers 602 is represented by curve 604, amongst an example set of about 10,000 bulk messages. In this example, the messages (e.g., a subset of 104) that correspond to each pattern template (e.g., 124, 126 and 128) are determined and the data is used to generate the graph (e.g., 600). The curve 604 represents the cumulative total coverage of the generated pattern templates (e.g., 124, 126 and 128) in terms of the percentage of the total messages (e.g., 104) with respect to the ordered set of pattern templates. As will be appreciated by one skilled in the art, a variety of analytical insights may be generated using the generated pattern templates. The technique described above facilitates extraction of accurate information from short texts, which could be used for various value-add use-cases, such as, for generating personalized recommendations, predictive modelling, and so forth in a variety of domains.

It should be noted that the techniques described above facilitate automatic learning and generation of new pattern templates from transactional messages without human intervention that reduces the time lag between new message capture and feature extraction. The system described above also helps increasing the computational performance for information extraction and increases the coverage of messages by templates to 100%. Comprehensive coverage in-turn helps in more accurate and richer feature extraction that help various models being built on top of that data and the analysis being done.

Figure 7:
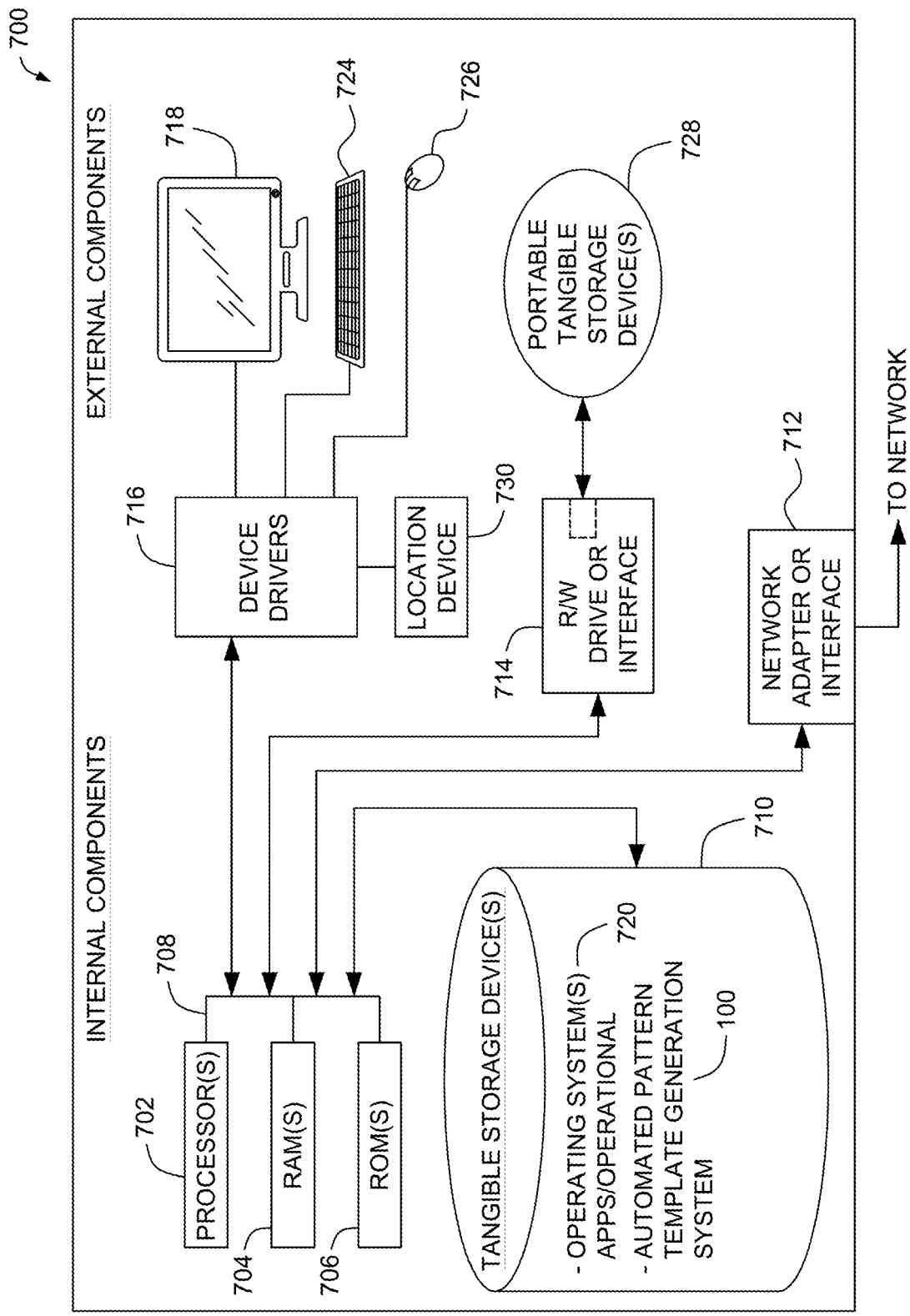
FIG. 7 is a block diagram of an embodiment of a computing device in which the modules of the automated pattern template generation system, described herein, are implemented.

The modules of the automated pattern template generation system 100 described herein are implemented in computing devices. One example of a computing device 700 is described below in FIG. 7. The computing device includes one or more processor 702, one or more computer-readable RAMs 704 and one or more computer-readable ROMs 706 on one or more buses 708. Further, computing device 700 includes a tangible storage device 710 that may be used to execute operating systems 720 and the automated pattern template generation system 100. The various modules of the automated pattern template generation system 100 includes a memory 130, a processor 132 and an output 134. The modules may be stored in tangible storage device 710. Both, the operating system 720 and the system 100 are executed by processor 702 via one or more respective RAMs 704 (which typically include cache memory). The execution of the operating system 720 and/or the system 100 by the processor 702, configures the processor 702 as a special purpose processor configured to carry out the functionalities of the operation system 720 and/or the automated pattern template generation system 100 as described above.

Examples of storage devices 728 include semiconductor storage devices devices such as ROM 706, EPROM, flash memory or any other computer-readable tangible storage device that may store a computer program and digital information.

Computing device also includes a R/W drive or interface 714 to read from and write to one or more portable computer-readable tangible storage devices 728 such as a CD-ROM, DVD, memory stick or semiconductor storage device. Further, network adapters or interfaces 712 such as a TCP/IP adapter cards, wireless Wi-Fi interface cards, or 3G or 4G wireless interface cards or other wired or wireless communication links are also included in computing device.

In one example embodiment, the automated pattern template generation system 100 which includes a memory 130, a processor 132 and an output 134, may be stored in tangible storage device 728 and may be downloaded from an external computer via a network (for example, the Internet, a local area network or other, wide area network) and network adapter or interface 712.

Computing device further includes device drivers 716 to interface with input and output devices. The input and output devices may include a computer display monitor 718, a keyboard 724, a keypad, a touch screen, a computer mouse 726, and/or some other suitable input device.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The afore mentioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The invention claimed is:

1. An automated pattern template generation system, the system comprising:
   a memory having computer-readable instructions stored therein; and
   a processor configured to:
      access a plurality of messages;
      process each of the plurality of messages to identify presence of one or more string identifiers and one or more numeric identifiers, wherein the one or more string identifiers and the one or more numeric identifiers denote different concepts present in the each message;
      replace each of the one or more identified numeric identifiers in the each message by a numeric label to generate one or more candidate templates;
      determine whether the one or more generated candidate templates are mergeable based on one or more pre-determined merging rules;
      responsive to the determination that the one or more generated candidate templates are mergeable, merge the one or more generated candidate templates to replace the one or more identified string identifiers with one or more pre-determined string labels to generate pattern templates, wherein each of the generated pattern templates comprises the one or more respective numeric labels and the one or more respective string labels;
      identify one or more candidate templates to be merged based upon presence of at least one of (i) a number of string identifiers, (ii) a number of numeric identifiers, (iii) matching positions of the string identifiers, (iv) matching positions of the numeric identifiers, and (v) a number of distinct string identifiers;
      merge the one or more identified candidate templates with then existing pattern templates to generate other pattern templates; and
      add message counts associated with the one or more identified candidate templates to determine a count for the one or more merged templates.

2. The automated pattern template generation system of claim 1, wherein the processor is further configured to execute the computer-readable instructions to process natural language short text messages received via an electronic device of a user.

3. The automated pattern template generation system of claim 2, wherein the processor is configured to process a short message service (SMS) text, an email, or combinations thereof.

4. The automated pattern template generation system of claim 3, wherein the processor is further configured to execute the computer-readable instructions to process a transactional message, a promotional message, an informational message, or combinations thereof.

5. The automated pattern template generation system of claim 4, wherein the processor is further configured to execute the computer-readable instructions to process the transactional messages received by a user from a financial entity that manages an account of the user, wherein the transactional messages are received in response to an occurrence of an event associated with the account.

6. The automated pattern template generation system of claim 5, wherein the processor is further configured to execute the computer-readable instructions to process transactional messages associated with credit transactions, debit transactions, or combinations thereof associated with the account.

7. The automated pattern template generation system of claim 1, wherein the processor is further configured to execute the computer-readable instructions to:
   identify at least one candidate template that cannot be merged with the then existing templates based upon number of string identifiers in the at least one template, number of numeric identifiers in the at least one template, matching positions of the string identifiers, matching positions of the numeric identifiers, number of distinct string identifiers in the at least one template, or combinations thereof;
   create a new pattern template; and
   associate a count corresponding to that of the at least one candidate template for each new pattern template.

8. The automated pattern template generation system of claim 7, wherein the processor is further configured to execute the computer-readable instructions to identify the at least one candidate template to be merged with the then existing pattern templates based upon templates that have at least one of the string identifiers and the numeric identifiers within a user defined range of positions in the respective templates.

9. The automated pattern template generation system of claim 1, wherein the processor is further configured to execute the computer-readable instructions to:
   analyze user information over a period of time using the generated pattern templates; and
   generating customer related insights for each user or at an aggregate level based on the information.

10. The automated pattern template generation system of claim 9, wherein the processor is further configured to execute the computer-readable instructions to generate personalized user recommendations, location estimation information, user income estimation information, customer credit default behaviors, customer behavioral information, customer preferences, or combinations thereof.

11. An automated pattern template generation system, the system comprising:
    a memory having computer-readable instructions stored therein;
    a templates repository having a plurality of pattern templates stored therein; and
    a processor configured to:
       receive a message transmitted to a user by an external agency;
       process the message to identify presence of a string identifier and a numeric identifier in the transactional message, wherein the string identifier and the numeric identifier denote different concepts present in the message;
       replace the identified numeric identifier in the message by a numeric label to generate one or more candidate templates;

compare the one or more generated candidate templates with the stored pattern templates to determine whether the one or more generated candidate templates can be merged with an existing pattern template, wherein one or more candidate templates to be merged are identified based upon presence of at least one of (i) a number of string identifiers, (ii) a number of numeric identifiers, (iii) matching positions of the string identifiers, (iv) matching positions of the numeric identifiers, and (v) a number of distinct string identifiers;

responsive to the determination indicating mergeability, merge the one or more identified candidate templates with at least one of the plurality of pattern templates, wherein one or more of the distinct string identifiers are replaced with one or more string labels; or create a new pattern template equivalent to the respective candidate template; and add message counts associated with the one or more identified candidate templates to determine a count for the one or more merged templates.

12. The automated pattern template generation system of claim 11, wherein the processor is further configured to execute the computer-readable instructions to process the messages received from a retail entity, a financial entity, a social media site, an e-commerce portal, a government entity, or combinations thereof.

13. The automated pattern template generation system of claim 11, wherein the processor is further configured to execute the computer-readable instructions to:

store the generated candidate templates in the templates repository; and maintain a count of the generated candidate templates using a template counter.

14. The automated pattern template generation system of claim 11, wherein the processor is further configured to execute the computer-readable instructions to:

increase a message count of an existing pattern template with that of a first candidate template if the first candidate template is merged;

add the first candidate template as a new pattern template if the first candidate template is not merged with an existing pattern template; and initialize the message count of the new pattern template with that of the first candidate template if the first candidate template is not merged with an existing pattern template.

15. The automated pattern template generation system of claim 11, wherein the processor is further configured to execute the computer-readable instructions to identify string labels to replace the string identifiers while merging the one or more candidate templates to generate the respective pattern templates.

16. A method for generating pattern templates, the method comprising:

accessing a plurality of messages;

processing each of the plurality of messages to identify presence of a string identifier and a numeric identifier, wherein the string identifier and the numeric identifier denote different concepts present in the each message;

replacing the identified numeric identifier in the each message by a numeric label to generate one or more candidate templates;

determining whether the one or more generated candidate templates are mergeable based on one or more predetermined merging rules;

responsive to the determination that the one or more generated candidate templates are mergeable, merging the one or more generated candidate templates to generate the pattern templates, wherein the identified string identifier is replaced with one or more predetermined string labels; and storing the one or more generated candidate templates and the pattern templates;

identifying one or more candidate templates to be merged based upon presence of at least one of (i) a number of string identifiers, (ii) a number of numeric identifiers, (iii) matching positions of the string identifiers, (iv) matching positions of the numeric identifiers, and (v) a number of distinct string identifiers;

merging the one or more identified candidate templates with then existing pattern templates to generate other pattern templates; and adding message counts associated with the one or more identified candidate templates to determine a count for the one or more merged templates.

17. The method of claim 16, further comprising merging the one or more identified candidate templates such that each of the one or more generated pattern templates comprises zero or more of the numeric label and the one or more string labels.

18. The method of claim 16, wherein storing the one or more generated candidate templates and the pattern templates comprising maintaining a count of the one or more candidate templates, the pattern templates, associated message counts, or combinations thereof.

* * * * *